United States Patent
Smith

(10) Patent No.: US 10,677,159 B2
(45) Date of Patent: Jun. 9, 2020

(54) GAS TURBINE ENGINE INCLUDING A DUAL-SPEED SPLIT COMPRESSOR

(71) Applicant: General Electric Company, Schenectady, NY (US)

(72) Inventor: Justin Paul Smith, Montgomery, OH (US)

(73) Assignee: General Electric Company, Schenectady, NY (US)

( * ) Notice: Subject to any disclaimer, the term of this patent is extended or adjusted under 35 U.S.C. 154(b) by 279 days.

(21) Appl. No.: 15/795,380

(22) Filed: Oct. 27, 2017

(65) Prior Publication Data
US 2019/0128181 A1    May 2, 2019

(51) Int. Cl.
*F02C 3/107* (2006.01)
*F02C 7/36* (2006.01)

(52) U.S. Cl.
CPC ............... *F02C 3/107* (2013.01); *F02C 7/36* (2013.01); *F05D 2220/3216* (2013.01); *F05D 2220/3219* (2013.01); *F05D 2260/4031* (2013.01)

(58) Field of Classification Search
CPC .. F02C 3/107; F02C 3/06; F02C 3/067; F02C 3/04; F02C 7/36; F05D 2260/4031; F05D 2260/40311; F05D 2220/3219; F05D 2220/3217
See application file for complete search history.

(56) References Cited

U.S. PATENT DOCUMENTS

| | | | | |
|---|---|---|---|---|
| 3,088,278 A * | 5/1963 | Franz | ...................... | F02C 3/145 60/791 |
| 3,524,318 A * | 8/1970 | Bouiller | .................. | F02C 3/067 60/226.1 |
| 4,005,575 A * | 2/1977 | Scott | ......................... | F02C 9/18 60/226.1 |
| 5,906,096 A * | 5/1999 | Siga | ........................ | C22C 38/44 415/199.5 |
| 6,339,927 B1 | 1/2002 | DiPietro, Jr. | | |
| 6,363,706 B1 | 4/2002 | Meister et al. | | |
| 7,386,983 B2 | 6/2008 | Miller | | |
| 8,607,576 B1 * | 12/2013 | Christians | ................. | F02C 7/36 60/792 |
| 8,887,485 B2 * | 11/2014 | Ress, Jr. | ................... | F02C 7/36 403/1 |
| 8,956,108 B2 | 2/2015 | Eleftheriou et al. | | |
| 9,404,425 B2 | 8/2016 | Martin | | |
| 9,624,828 B2 | 4/2017 | Sabnis | | |
| 2009/0293445 A1 * | 12/2009 | Ress, Jr. | ................. | F02C 3/067 60/39.15 |
| 2009/0314003 A1 * | 12/2009 | Talan | ........................ | F01D 5/06 60/778 |
| 2010/0223904 A1 * | 9/2010 | Edwards | ................. | F02C 3/067 60/224 |

(Continued)

*Primary Examiner* — Richard A Edgar
*Assistant Examiner* — Joshua R Beebe
(74) *Attorney, Agent, or Firm* — Dority & Manning, P.A.

(57) ABSTRACT

A gas turbine engine includes a low pressure compressor, a high pressure compressor, a turbine, and a gearbox. The high pressure compressor includes a plurality of stages split into a forward portion and an aft portion. One or both of the forward portion and the aft portion of the high pressure compressor are driven by the turbine through a gearbox such that the forward portion and the aft portion may rotate at different speeds.

17 Claims, 4 Drawing Sheets

(56) References Cited

U.S. PATENT DOCUMENTS

| | | | | |
|---|---|---|---|---|
| 2013/0223984 A1* | 8/2013 | Gehlot | .................. | F04D 19/024 |
| | | | | 415/68 |
| 2013/0259651 A1* | 10/2013 | Kupratis | ................. | F02C 3/113 |
| | | | | 415/122.1 |
| 2014/0250860 A1* | 9/2014 | Sidelkovskiy | .......... | F02C 3/107 |
| | | | | 60/39.15 |
| 2016/0047335 A1* | 2/2016 | Davidson | ................ | F02C 3/107 |
| | | | | 60/792 |

* cited by examiner

GAS TURBINE ENGINE INCLUDING A DUAL-SPEED SPLIT COMPRESSOR

FIELD

The present subject matter relates generally to gas turbine engines. More particularly, the present subject matter relates to gas turbine engines including gearboxes for regulating the speed of selected stages of a split compressor.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

The compressor section and the turbine section of conventional gas turbine engines are coupled by one or more shafts or spools. More specifically, a low pressure compressor and a low pressure turbine may be coupled by a low pressure spool and a high pressure compressor and high pressure turbine may be couple by a high pressure spool. Notably, however, the rotational speed of aft stages of a multistage compressor is often limited by tip speed constraints of the forward stages which have larger radii. Tip speeds of the aft stages could be increased by simply increasing their radius, but the blade height may become unacceptably small relative to the tip clearances which increase losses in a given stage.

Accordingly, a gas turbine engine with an improved compressor section would be useful. More specifically, a dual-speed split compressor having multiple stages rotating at different speeds for decreased compressor size and improved performance and efficiency would be particularly beneficial.

BRIEF DESCRIPTION

Aspects and advantages of the invention will be set forth in part in the following description, or may be obvious from the description, or may be learned through practice of the invention.

In one exemplary embodiment of the present disclosure, a gas turbine engine includes a turbine section including a turbine and a compressor section located upstream of the turbine section including a compressor, the compressor including a forward portion and an aft portion. The gas turbine engine further includes a gearbox, at least one of the forward portion and the aft portion of the compressor being driven by the turbine through the gearbox.

In another exemplary embodiment of the present disclosure, a gas turbine engine includes a turbine section including a turbine and a compressor section located upstream of the turbine section including a low pressure compressor and a high pressure compressor, the high pressure compressor including a forward portion and an aft portion. The gas turbine engine further includes a gearbox, at least one of the forward portion and the aft portion of the high pressure compressor being driven by the turbine through the gearbox.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
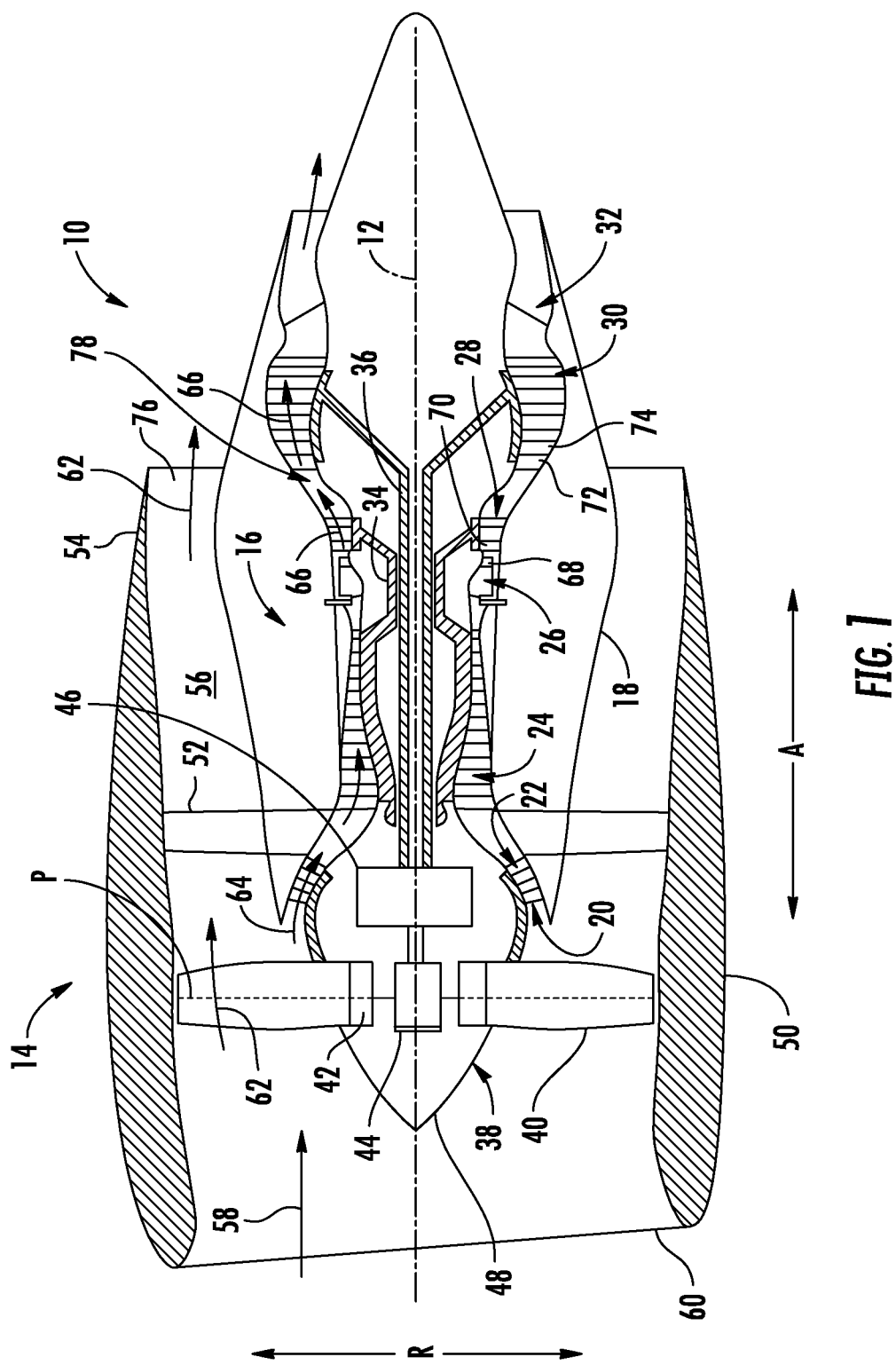
FIG. 1 provides a schematic cross-sectional view of an exemplary gas turbine engine according to various exemplary embodiments of the present subject matter.

Repeat use of reference characters in the present specification and drawings is intended to represent the same or analogous features or elements of the present invention.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows and "downstream" refers to the direction to which the fluid flows. In addition, terms of approximation, such as "approximately," "substantially," or "about," refer to being within a ten percent margin of error.

Aspects of the present disclosure are directed to a gas turbine engine having a dual-speed split compressor. The gas turbine engine includes a low pressure compressor, a high pressure compressor, a turbine, and a gearbox. The high pressure compressor includes a plurality of stages split into a forward portion and an aft portion. One or both of the forward portion and the aft portion of the high pressure compressor are driven by the turbine through a gearbox such that the forward portion and the aft portion may rotate at different speeds.

FIG. 1 provides a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. In other embodiments of turbofan engine 10, additional spools may be provided such that engine 10 may be described as a multi-spool engine.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is by way of example only, and that in other exemplary embodiments, the turbofan engine 10 may have any other suitable configuration and the present subject matter may be applicable to other types of turbomachinery. For example, in other exemplary embodiments, the turbofan engine 10 may instead be configured as, e.g., a direct-drive turbofan engine, a fixed-pitch turbofan engine, etc. Additionally, or alternatively, the turbofan engine 10 may be configured as a turboprop engine, a turbojet engine, a turboshaft engine, a ramjet engine, an auxiliary power unit engine, etc. Additionally, or alternatively, still, in other embodiments the turbofan engine 10 of FIG. 1 may instead be configured as an aeroderivative gas turbine engine, e.g., for nautical uses, or as an industrial gas turbine engine, e.g., for power generation.

Figure 2:
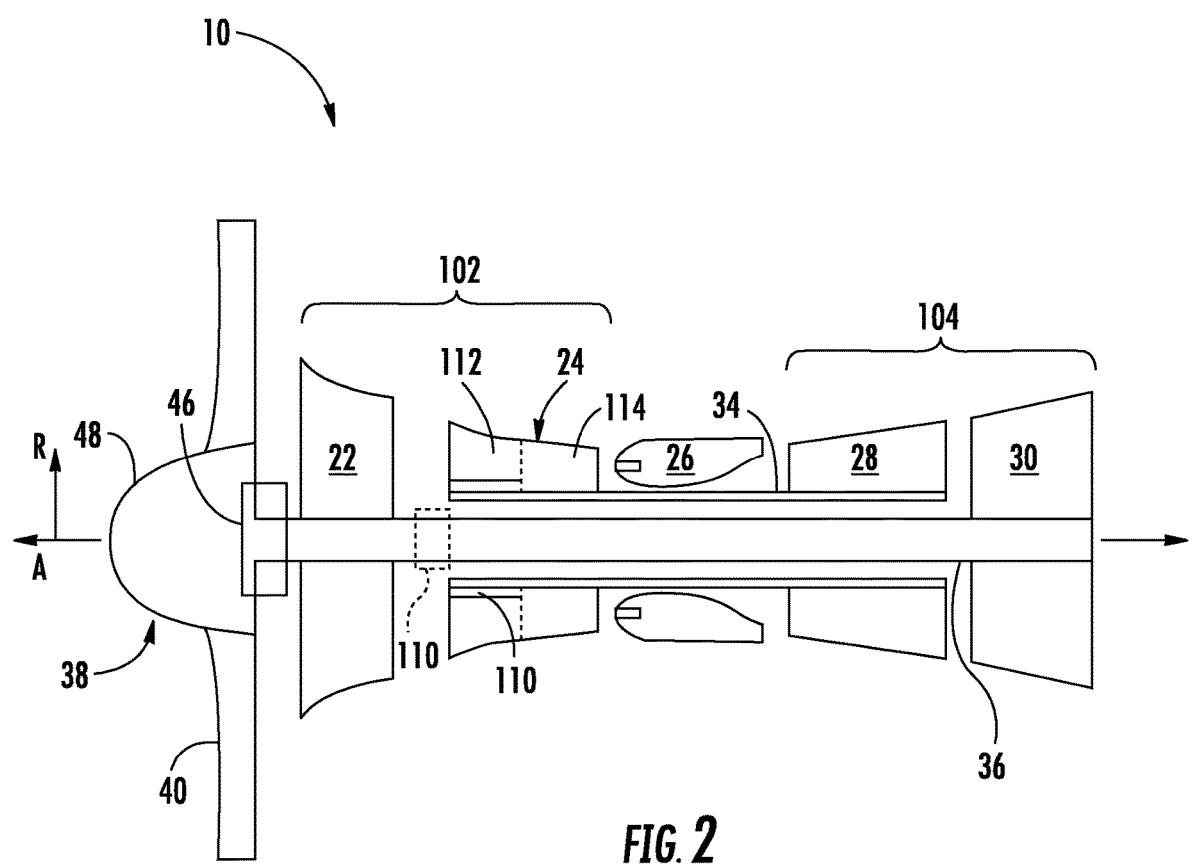
FIG. 2 provides a schematic view of the exemplary gas turbine engine of FIG. 1 including one or more gearboxes according to an exemplary embodiment of the present subject matter.

Referring now to FIG. 2, a schematic view of a gas turbine engine including one or more gearboxes according to an exemplary embodiment of the present subject matter is provided. More specifically, FIG. 2 provides a schematic representation of turbofan engine 10 using similar reference numerals to refer to like components. However, it should be appreciated that turbofan engine 10 is used only as an exemplary engine for the purpose of describing aspects of the present subject matter. Turbofan engine 10 may be modified and such modifications may be within the scope of the present subject matter. In addition, turbofan engine 10 may be configured for use in other applications, such as other gas turbine engines or any other suitable application where it is desirable to vary the speeds of various stages of the compressor of a gas turbine engine.

As illustrated in FIG. 2 and described above, turbofan engine 10 generally includes a fan 38, a compressor section 102, combustion section 26, and a turbine section 104 that are arranged in serial flow order. More specifically, according to the illustrated embodiment, compressor section 102 includes LP compressor 22 positioned upstream of HP compressor 24 and turbine section 104 includes HP turbine 28 positioned upstream from LP turbine 30. It should be appreciated that although compressor section 102 and turbine section 104 are described herein as having two compressors and turbines, respectively, alternative embodiments may include any suitable number of compressors and turbines having any suitable number of stages.

As explained above, it is often desirable to operate LP compressor 22 and HP compressor 24, or stages within these compressors, at different speeds. Therefore, according to an exemplary embodiment of the present subject matter, turbofan engine 10 includes one or more gearboxes 110 that are configured to enable different rotary components to rotate in different speeds or directions to decrease overall engine size and increase overall engine performance and efficiency. As used herein, a "stage" of a compressor or turbine is intended to refer to a pair of rotating and stationary airfoils. The speed of a particular stage refers to the rotational speed of the rotary airfoil. It should be appreciated that each compressor is made up of a plurality of stacked stages that progressively compress the air prior to passing it to the combustion section 26 for combustion.

As illustrated in FIG. 2, HP compressor 24 includes a forward portion 112 and an aft portion 114. More specifically, forward portion 112 may include one or more compressor stages and aft portion may include one or more compressor stages. According to an exemplary embodiment, one or both of forward portion 112 and aft portion 114 are operably coupled to turbine section 104 through gearbox 110. In this manner, for example, at least one of forward portion 112 and aft portion 114 of HP compressor 24 are driven by HP turbine 28 through gearbox 110.

More specifically, according to the illustrated embodiment, forward portion 112 of HP compressor 24 is driven by HP turbine 28 through gearbox 110, such that forward portion 112 of HP compressor 24 is configured to rotate more slowly than aft portion 114 of HP compressor 24. In this manner, HP compressor 24 may be split into two distinct sections with gearbox 110 allowing each section to rotate at a different speed. In this manner, aft portion 114 may operate at a higher speed to increase the pressure ratio capability of HP compressor 24 while forward portion 112 may operate at a lower speed to keep the tip speed of forward portion 112 within the desired ranges.

As used herein, gearbox 110 may refer to any device or devices suitable for transmitting mechanical force between rotating components. According to an exemplary embodiment, gearbox 110 is an epicyclic gearbox having a planetary gear train or configuration. However, according to alternative embodiments, gearbox 110 may include any suitable combination or planetary gears, helical gears, spur gears, worm gears, bevel gears, or any other suitable component for mechanical transmission.

According to alternative embodiments of the present subject matter, gearbox 110 may also be operably coupled to fan 38 of fan section 14. In this manner, fan 38 is driven at least in part by turbine section 104, or more specifically LP turbine 30, through gearbox 110. Notably, when gearbox 110 is used to drive fan 38, as illustrated by the dotted line gearbox 110 in FIG. 2, gearbox 110 may operate in conjunction with power gearbox 46 or power gearbox 46 may be eliminated altogether.

Indeed, gearbox 110 may be configured to operably couple turbine section 104 (either HP turbine 28 or LP turbine 30) to any suitable portion of turbofan engine 10. For example, LP compressor 22 may also be driven by turbine section 104 through gearbox 110. In addition, gearbox 110 may be coupled to both forward portion 112 and aft portion 114, e.g., such that HP turbine 28 can operate forward portions 112 and aft portion 114 at different speeds and at different speeds than the rotational speed of HP turbine 28.

In addition to rotating portions of compressor section 102 at different speeds, gearbox 110 may be configured for rotating portions in different directions according to exemplary embodiments. For example, according to one embodiment forward portion 112 is configured to rotate in a first circumferential direction and aft portion 114 is configured to rotate in a second circumferential direction. According to one embodiment, the first circumferential direction is the same as the second circumferential direction, and in another embodiment, it is the opposite. According to still other embodiments, gearbox 110 may be coupled to both LP compressor 22 and HP compressor for driven these compressors or stages of these compressors in different directions and/or different speeds.

Figure 3:
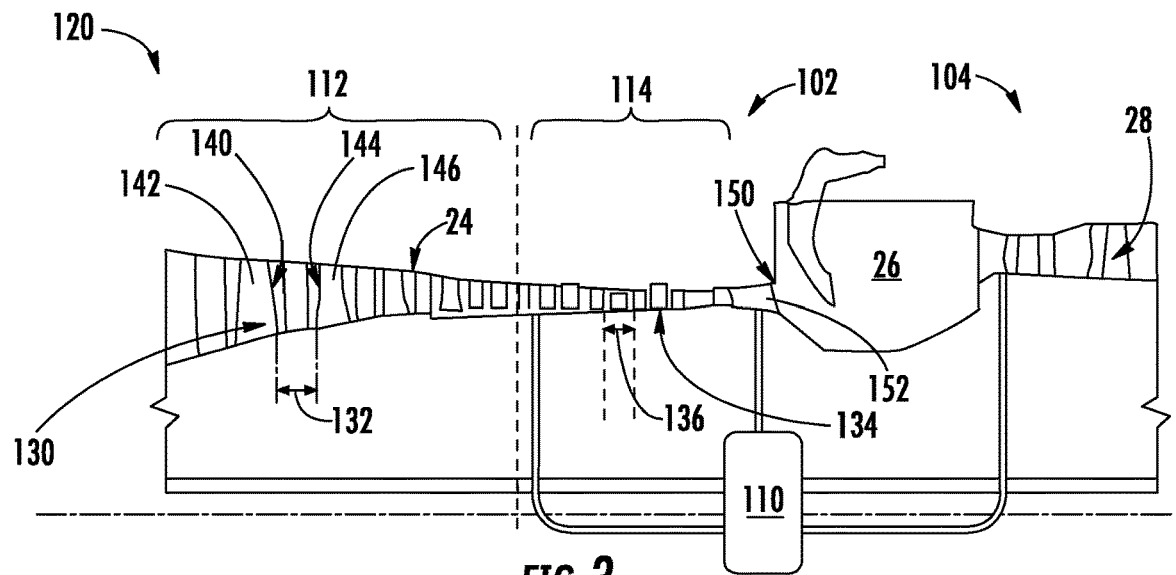
FIG. 3 provides a schematic, cross-sectional view of a split compressor of a gas turbine engine with axial flow compressors and an aft section operably coupled with a gearbox according to an exemplary embodiment of the present subject matter.
Figure 4:
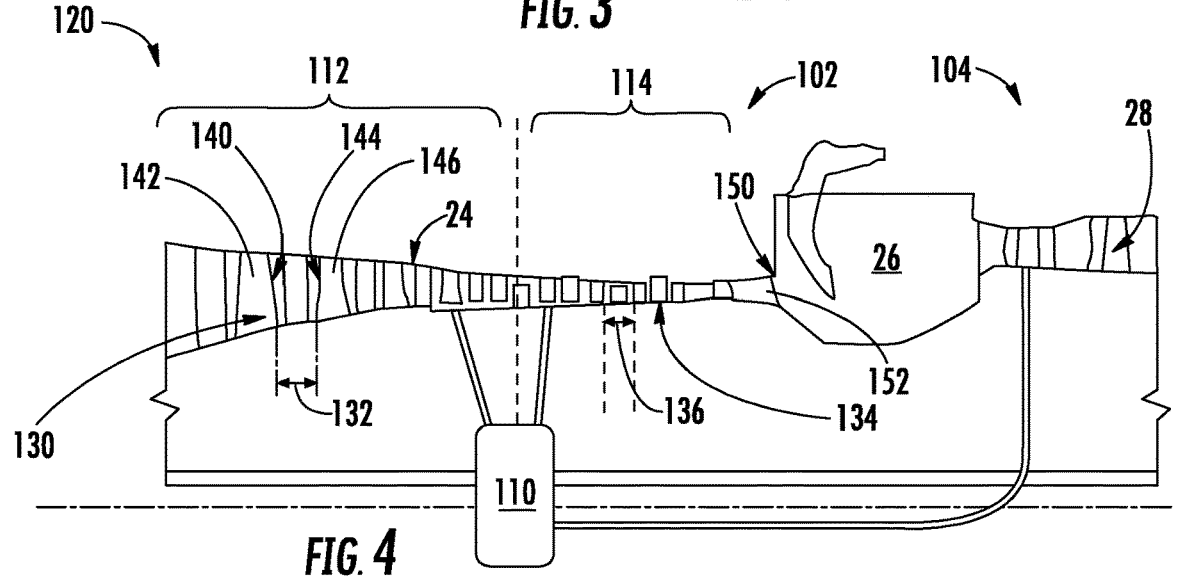
FIG. 4 provides a schematic, cross-sectional view of a split compressor of a gas turbine engine with axial flow compressors and an intermediate section operably coupled with a gearbox according to an exemplary embodiment of the present subject matter.
Figure 5:
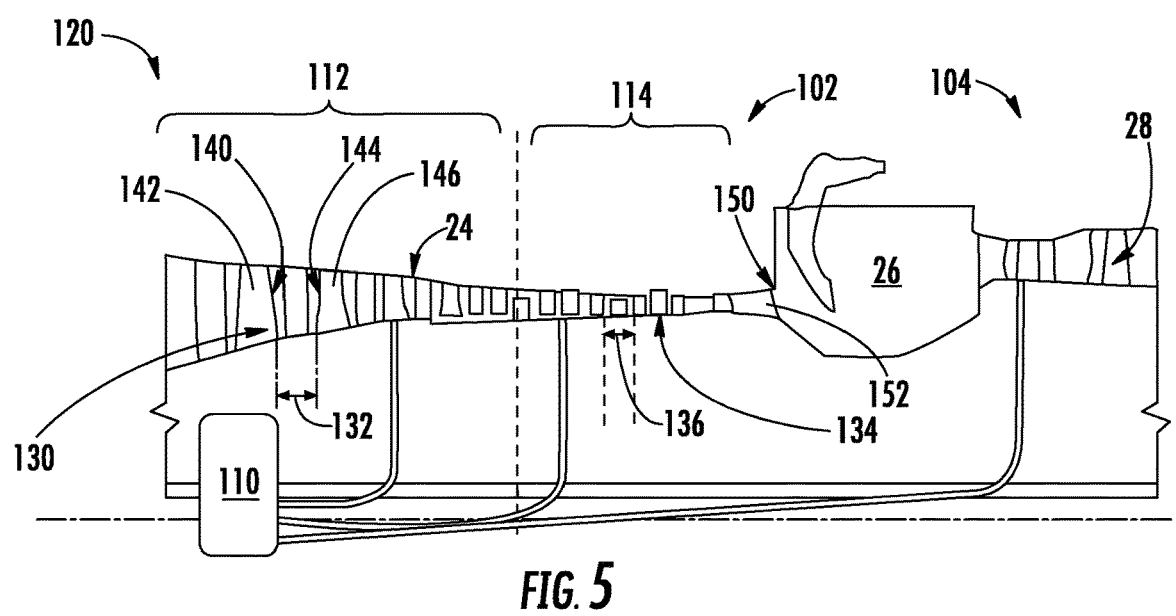
FIG. 5 provides a schematic, cross-sectional view of a split compressor of a gas turbine engine with axial flow compressors and a forward section operably coupled with a gearbox according to an exemplary embodiment of the present subject matter.
Figure 6:
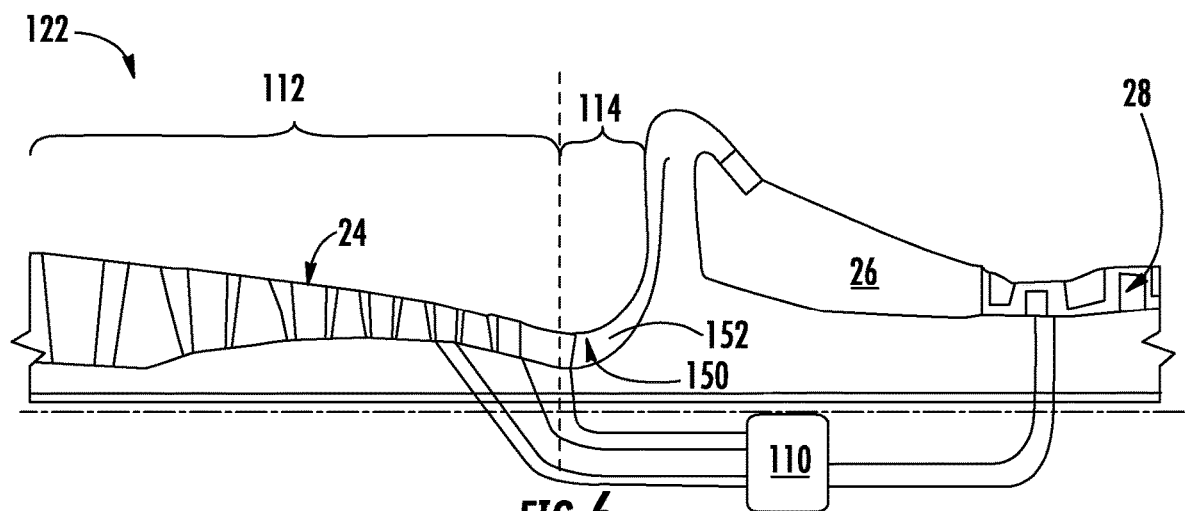
FIG. 6 provides a schematic, cross-sectional view of a split compressor of a gas turbine engine with axial and centrifugal compressors and an aft centrifugal section operably coupled with a gearbox according to an exemplary embodiment of the present subject matter.
Figure 7:
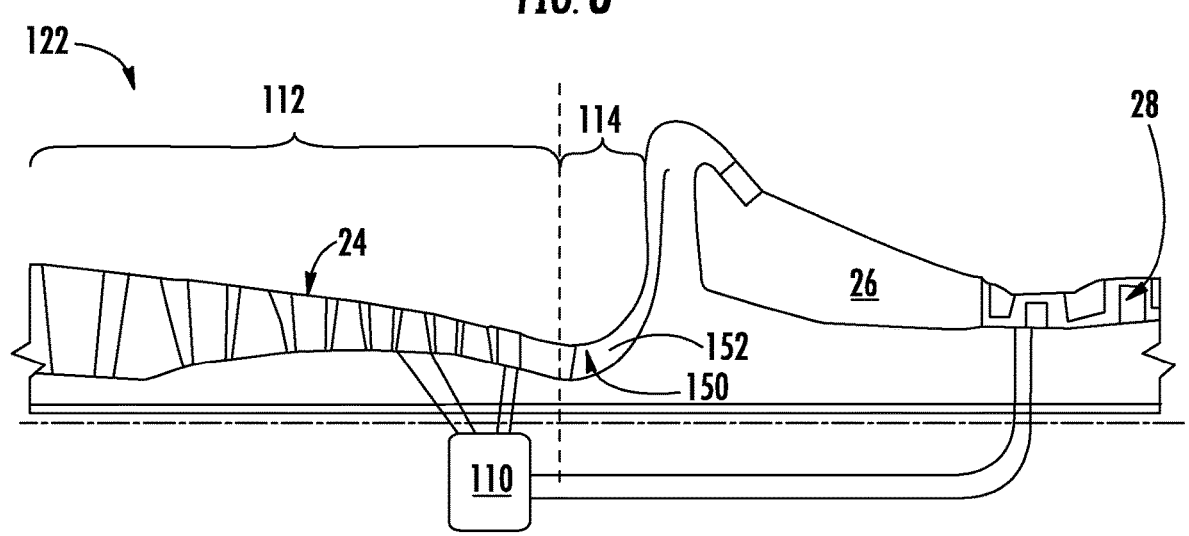
FIG. 7 provides a schematic, cross-sectional view of a split compressor of a gas turbine engine with axial and centrifugal compressors and an aft axial section operably coupled with a gearbox according to an exemplary embodiment of the present subject matter.
Figure 8:
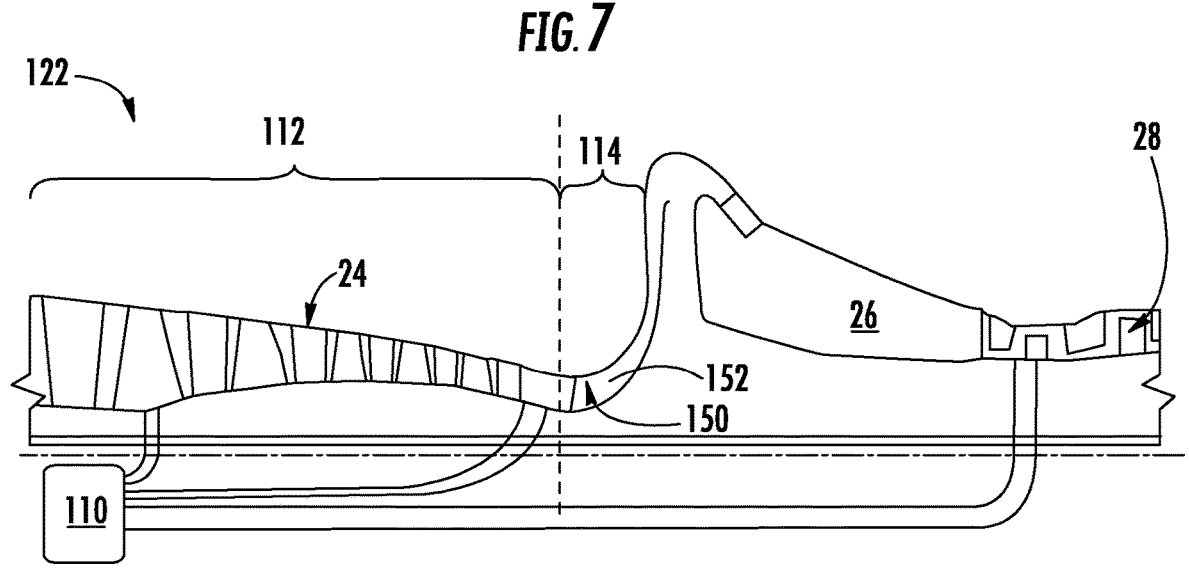
FIG. 8 provides a schematic, cross-sectional view of a split compressor of a gas turbine engine with axial and centrifugal compressors and a forward axial section operably coupled with a gearbox according to an exemplary embodiment of the present subject matter.

Referring now to FIGS. 3 through 8, cross sectional views of gas turbine engines are illustrated along with a schematic representation of turbine section 104 and one or more portions of compressor section 102 being coupled by the exemplary gearbox 110. More specifically, FIGS. 3 through 5 illustrate an axial flow engine 120 with an axially oriented combustor section 26 (similar to turbofan engine 10 from FIG. 1). By contrast, FIGS. 6 through 8 illustrated an axial flow engine 122 with a centrifugal or radial inlet to combustor section 26. Like reference numerals will be used to refer to the same or similar components in these two sets of figures.

As illustrated in all of FIGS. 3 through 8, forward portion 112 of HP compressor 24 includes a first plurality of stages of compressor rotor blades 130 that define a first average axial spacing 132. Similarly, aft portion 114 of HP compressor 24 includes a second plurality of stages of compressor rotor blades 134 that define a second average axial spacing 136. As used herein, the "average axial spacing," when used to refer to a particular compressor stage, may be an average distance measured along the axial direction A (FIG. 1) between a downstream edge 140 of an upstream rotor blade 142 and an upstream edge 144 of an adjacent downstream rotor blade 146. According to one embodiment, the second average axial spacing 136 is less than or equal to two times the first average axial spacing 132. According to another embodiment, the second average axial spacing 136 is less than or equal to the first average axial spacing 132.

In addition, according to an exemplary embodiment, first average axial spacing 132 and second average axial spacing 136 may be related to a height of the respective stages of rotor blades. In this regard, for example, first average axial spacing 132 may be between about 10% and 30%, or about 20%, of an average blade height of the first plurality of stages of compressor rotor blades 130. Similarly, for example, second average axial spacing 136 may be between about 40% and 60%, or about 50%, of an average blade height of the second plurality of stages of compressor rotor blades 134.

Gearbox 110 may be positioned at any suitable location within a gas turbine engine according to exemplary embodiments of the present subject matter. For example, referring to FIGS. 3 and 6, gearbox 110 is aligned adjacent to or downstream of aft portion 114 of HP compressor 24. According to still another embodiment, compressor section 26 further includes a compressor discharge nozzle module 150 which includes a diffuser 152 for diffusing compressed air prior to entry into combustion section 26. According to exemplary embodiments, gearbox 110 is mounted to compressor discharge nozzle module 150.

Alternatively, as shown in FIGS. 4 and 7, gearbox 110 may be positioned at an intermediate location axially along HP compressor 24. So positioned, gearbox 110 may be operably coupled to a forward portion 112 of HP compressor 24, an aft portion 114 of HP compressor 24, an intermediate portion of HP compressor 24, or any other suitable combination of the various stages of rotor blades in HP compressor 24. Alternatively, as shown in FIGS. 5 and 8, gearbox 110 is aligned with forward portion 112 of HP compressor 24 or even forward of HP compressor 24. According to still another embodiment, gearbox 110 may positioned anywhere upstream of HP compressor 24 or LP compressor 22 and downstream of fan 38.

Although FIG. 2 illustrates LP compressor 22 and HP compressor 24, with HP compressor 24 split into forward portion 112 and aft portion 114, it should be appreciated that this configuration of turbofan engine 10 is only exemplary and not intended to limit the scope of the present subject matter. For example, LP compressor 22 and/or HP compressor 24 may be split into any suitable number of stages, and each respective stage may be operably coupled to gearbox 110 as needed for a particular application. In addition, more than one gearbox 110 may be used having any suitable size or configuration for driving the respective stages.

Moreover, although all embodiments illustrated herein have gearbox 110 coupled to one or more stages of the HP compressor 24, it should be appreciated that such a configuration is only exemplary and not intended to limit the scope of the present subject matter. For example, gearbox 110 may operably couple any two rotating components within a core turbine engine 16 of turbofan engine 10 for the purpose of reducing or increasing the rotational speed of a driven component.

A gas turbine engine having a dual-speed split compressor is described above. More specifically, for example, the high pressure compressor of a gas turbine engine is split into two distinct sections with a gearbox allowing each section to rotate at a different speed. The high pressure turbine that drives the compressor can be either directly coupled to one of the compressor sections or geared to both allowing for up to three different rotational speeds. The two sections of the compressor can be axial flow and axial flow, axial flow and centrifugal flow, or centrifugal and centrifugal flow. The exact stage count of any axial section can be tailored for a specific application and aerodynamic design. The gearbox itself can be located forward of both compressor sections, aft of both compressor sections, or at the split line between the two compressor sections. Other configurations of gas turbine engines are possible and contemplated as within the scope of the present subject matter.

Notably, by breaking the compressor into two sections, the rotational speed of each section can be better tailored using the subject matter described herein. In this manner, the overall performance and pressure ratio capability of a given number of compressive stages may be improved. In addition, increasing the speed of the aft stages of a compressor can decrease its physical size. Thus, using aspects of the present subject matter may result in a gas turbine engine having improved overall size, efficiency, and fuel burn capabilities.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A gas turbine engine comprising:
   a turbine section comprising a turbine;
   a compressor section located upstream of the turbine section comprising a compressor, the compressor comprising a forward portion and an aft portion, wherein the forward portion of the compressor comprises a first plurality of stages of compressor rotor blades, the first plurality of stages of compressor rotor blades defining a first average axial spacing and a first average blade height, and wherein the aft portion of the compressor comprises a second plurality of stages of compressor rotor blades, the second plurality of stages of compressor rotor blades defining a second average axial spacing and a second average blade height, wherein the first average axial spacing is between about 10% and 30% of the first average blade height and the second average axial spacing is between about 40% and 60% of the second average blade height; and
   a gearbox, at least one of the forward portion and the aft portion of the compressor being driven by the turbine through the gearbox.

2. The gas turbine engine of claim 1, wherein the second average axial spacing is less than or equal to two times the first average axial spacing.

3. The gas turbine engine of claim 2, wherein the second average axial spacing is less than or equal to the first average axial spacing.

4. The gas turbine engine of claim 1, wherein the forward portion of the compressor is driven by the turbine through the gearbox, such that the forward portion of the compressor is configured to rotate more slowly than the aft portion of the compressor.

5. The gas turbine engine of claim 1, wherein both the forward portion and the aft portion of the compressor are driven by the turbine through the gearbox.

6. The gas turbine engine of claim 1, wherein the compressor is a high pressure compressor, wherein the compressor section further comprises a low pressure compressor.

7. The gas turbine engine of claim 6, wherein the turbine is a high pressure turbine, and wherein the turbine section further comprises a low pressure turbine.

8. The gas turbine engine of claim 1, wherein the gearbox is a planetary gear box.

9. The gas turbine engine of claim 1, wherein the compressor section further comprises a compressor discharge nozzle module, wherein the gearbox is mounted to the compressor discharge nozzle module.

10. The gas turbine engine of claim 1, wherein the gearbox is located forward of the compressor of the compressor section.

11. The gas turbine engine of claim 1, wherein the gearbox is aligned with the forward portion of the compressor or the aft portion of the compressor along an axial direction of the gas turbine engine.

12. The gas turbine engine of claim 1, wherein the forward portion of the compressor is configured to rotate in a first circumferential direction of the gas turbine engine, wherein the aft portion of the compressor is configured to rotate in a second circumferential direction of the gas turbine engine, and wherein the first circumferential direction of the gas turbine engine is opposite the second circumferential direction of the gas turbine engine.

13. The gas turbine engine of claim 1, wherein the forward portion of the compressor is configured to rotate in a first circumferential direction of the gas turbine engine, and wherein the aft portion of the compressor is also configured to rotate in the first circumferential direction of the gas turbine engine.

14. The gas turbine engine of claim 1, further comprising:
a combustion section, wherein the compressor section, the combustion section, and the turbine section are arranged in serial flow order.

15. The gas turbine engine of claim 14, wherein the compressor section includes a centrifugal compressor.

16. The gas turbine engine of claim 1, further comprising:
a fan, wherein the fan is driven at least in part by the turbine through the gearbox.

17. The gas turbine engine of claim 1, wherein the compressor is a high pressure compressor, wherein the compressor section further comprises a low pressure compressor, and wherein the low pressure compressor is driven by the turbine through the gearbox.

* * * * *